3,081,283
POLYMERIZATION AND COATING PROCESSES AND PRODUCTS
George Bosmajian, Severna Park, Md., assignor, by mesne assignments, to Cities Service Research and Development Company, New York, N.Y., a corporation of New Jersey
No Drawing. Filed Oct. 7, 1959, Ser. No. 844,859
8 Claims. (Cl. 260—78.5)

This invention includes the preparation of a copolymer of butadiene and maleic anhydride, and the coating of metals therewith.

One of the problems with which the invention is concerned is the protection of metal surfaces against deterioration and particularly against corrosion. A specific embodiment of the invention includes the coating of sheet metals utilized in containers, cans, bottle crowns, screw-top caps, and similar articles. The protective coatings also are useful for metal articles in general.

Numerous prior attempts have been made to prepare and use butadiene polymers and copolymers in forming coatings such as in the preparation of can linings, but very few have been found to be acceptable. Thus, in the use of polymers prepared with Friedel-Crafts catalysts such as aluminum chloride, a common deficiency appears in subjecting the product to "boiling water" tests in that apparently residual aluminum chloride is hydrolyzed to aluminum hydroxide, producing a result called "blushing" in which the coating has a milky or hazy appearance and in some cases a streaked appearance. Other coatings have been prepared from polymers obtained using various catalysts including sodium, peroxides and other catalysts, and such polymers often are not fully satisfactory in that they are either too brittle and fracture in operations such as the can forming operation, or are excessively soft and rubbery, and undergo deformation to such an extent that they are unusable. Also, in some cases, polymers including halogens and acetate radicals have caused difficulty in that in contact with certain can contents these polymers release halogens or acetic acid.

An object of the present invention is to provide a novel copolymer of butadiene and maleic anhydride, said polymer having desirable characteristics, and a process of preparing the same.

Another object of this invention is to provide a novel metal article having a resinous coating thereupon prepared from the copolymer of the invention, and a process of preparing such article. Yet another object is to obtain and utilize a liquid copolymer in accordance with the preceding objects of invention.

The polymer is prepared by reacting the comonomers, consisting of about 90 to 99.5% butadiene, and about 0.5 to 10% maleic anhydride, using an inert organic solvent, an organic peroxide initiator or catalyst, and moderately elevated temperature. Larger amounts of maleic anhydride may be used, but there is little advantage in doing so. About 0.1 to about 5% maleic anhydride is incorporated in the polymer; as the proportion of maleic anhydride is increased in the reaction mixture, the ratio of unreacted to reacted maleic anhydride increases. By way of example, 9% and 1% maleic anhydride in the monomer mixture resulted in about 2% and 0.8%, respectively, of maleic anhydride incorporated in the polymer. When no maleic anhydride is utilized, the conditions otherwise being identical, substantial gel formation takes place during the polymerization, and the polymer is less satisfactory as a metal coating material. An unsaturated polymer having desirable characteristics, including definite unsaturation types and proportions thereof, is obtained.

The polymer is applied to metallic substrates such as sheets or preformed articles and cured preferably in the presence of oxygen, with heat if desired, forming an exceptional resinous coating which is hard, flexible and chemically resistant. The coated articles may be used as such or subsequently mechanically formed into other articles.

This invention resides partially in the discovery that a copolymer of butadiene and maleic anhydride prepared under the conditions of this invention, is markedly superior to somewhat similar polymers prepared by other methods. The polymers of this invention are believed to have distinctive macromolecular structures, both in the uncured and cured, solid forms of polymer. This distinctive structure is one reason for the superiority of the final coatings obtained. Relevant details of the molecular structure are indicated by the types and the ratios of unsaturation types in the uncured polymer, which are dictated by the monomers utilized, polymerization conditions and similar features.

"Butadiene" refers to 1,3-butadiene as is conventional. The monomers need not be absolutely pure. Materials which inhibit the reaction should be absent, but if present, should be present in minimum amounts.

Throughout the specification, all parts are by weight, unless otherwise noted.

Reaction conditions are variable but generally are within limits which are critical. The quantity of peroxide varies between about 0.1% and 10%, preferably between about 1% and 3%, based on the weight of the monomers. The time is related to temperature, and is between about 1 and 18 hours. The time, in general, is varied inversely with temperature. Elevated temperatures of 50 to 200° C. are useful although about 125° C. is preferred. Useful catalysts or initiators include benzoyl peroxide, t-butyl hydroperoxide, cumene hydroperoxide, t-butyl perbenzoate, acetyl peroxide, and similar organic peroxy compounds which are soluble in the inert organic liquid reaction diluent. Solvents are desirably utilized, and useful solvents are those which do not react with the monomers, are inert to the catalyst, and do not polymerize in this reaction. Included are ligroin, benzene, xylene, cyclohexane, toluene, pentane, hexane, heptane, 1,4-dioxane, petroleum ether, and similar compounds or mixtures thereof. Other solvents including acetone and methyl ethyl ketones may be used, although preferably mixed with the above solvents, which are utilized in a predominant proportion. The preferred ratio of solvent or diluent to comonomers, by weight, is between 1 to 10 and 1 to 1, although higher ratios such as 5 to 1 and lower ratios such as 1 to 20 may be used. The pressure is the autogenous pressure developed by the system, and is usually between about 50 to 200 p.s.i.a. Higher and lower pressures are useful, for example, from about 20 to about 1,000 p.s.i.a. may be used.

Post-polymerization treatment of the polymer solution includes separating the gaseous from the liquid fluids in the reactor, separating unreacted maleic anhydride, if any, by filtration, followed by polymer isolation. The filtrate is preferably heated under vacuum to remove the solvent from the pure copolymer. If the solvent is such that it is useful in the coating operation and the polymer does not have a low enough viscosity for application as a coating with no solvent present, at least a part of the solvent may be retained with the polymer dissolved therein. Or the filtrate may be treated with an excess, say three times its volume, of methanol which precipitates most of the polymer. The preciptiated polymer is then finally purified by evaporation of the solvent and methanol contained therein. This latter method causes the loss of any methanol-soluble fraction.

The polymer is preferably an oily liquid having curing properties of drying oils; it is less desirably in the form of a soluble solid or semi-solid, however. In any event, the polymer must be curable to a resinous state as described herein. The intrinsic viscosity of the polymer is preferably between 0.1 and 0.3 deciliter per gram at 100° F. In utilizing the polymer, the viscosity of the liquid polymer or of a polymer solution of the liquid, semi-solid, or solid polymer, is preferably between 1000 and 5000 centistokes at 25° C. Higher and lower values are useful for some applications, since it is known that polymers having viscosities ranging from 3 to 100,000 centistokes at 25° C. may be applied as coatings. Polymer solvents, if used, may be the same as the reaction diluents listed above, although higher boiling materials such as xylene are preferred.

The polymerization process may be conducted in batches or continuously.

The macromolecular structure of the polymers according to this invention is relatively constant or reproducible as defined by the amounts and quantitative ratios of unsaturation types, total determinable unsaturation, and the ratios of monomers in the reaction mixture. "Unsaturation types" as the term is understood in the field of stereochemistry and as used herein refers to the mode of substitution of hydrogen and carbon atoms about a carbon to carbon double bond, i.e.

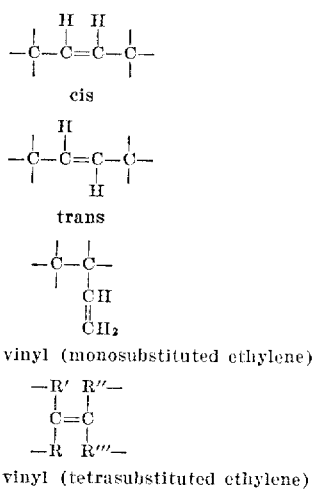

This terminology is also described in part in Chemical & Engineering News, vol. 37, No. 12, page 59, March 23, 1959. Absorptivity data for the determination of the several olefin types were from the spectra obtained, prior to the determinations described herein, from known olefins. These absorptivities confirmed those reported in the literature, e.g., McMurry, H. L., and Thornton, Vernon, "Correlation of Infrared Spectra of Paraffins, Olefins, and Aromatics with Structure"; Analytical Chemistry, vol 24, pages 318–34 (1952). Tetra-substituted vinyl is not readily ascertained using infrared data, and it has been postulated that such structure does occur in polymers of butadiene through cyclization. The quantities of the several types of unsaturation were determined from infrared spectra at wave lengths of 10.98±0.2 microns for monosubstituted vinyl unsaturation, 10.34±0.2 microns for trans unsaturation, and about 14 microns for cis unsaturation. Absorptivities for these determinations were:

| | Liters/mole-cm. |
|---|---|
| Cis | 92 |
| Trans | 118 |
| Monosubstituted vinyl | 149 |

The infrared spectrometer used was a Baird, Model 455.

Amounts of such unsaturation types as determined by infrared spectroscopy in the polymer according to this invention are in the following approximate ranges:

| | Moles/100 g. |
|---|---|
| Cis | 0.01–0.15 |
| Trans | 0.70–0.95 |
| Monosubstituted vinyl | 0.10–0.45 |

The cis and trans unsaturation types are considered to be the result of 1,4-addition. The minimum for infra red unsaturation for any particular polymer is not to be taken as equal to the sum of the lower limits tabulated above, nor is the maximum necessarily the sum of the upper limits. Thus, where a specific polymer is higher than average in, say, monosubstituted vinyl unsaturation, it could be at the expense of another type of unsaturation, although not necessarily.

Total chemically determined unsaturation ranges from about 1.15 to about 1.65 moles/100 g., and total unsaturation according to infrared analyses ranges from about 1.15 to about 1.55 moles/100 g. The qualities of the adherent, hard, flexible, cured coating are believed due in large part to the structure of the curable polymer as defined above. The following are representative of the methods for preparing the polymers of this invention, useful to form cured resinous coatings upon metal:

EXAMPLE 1

1,4-dioxane as solvent was combined with reactants consisting of 9% by weight of maleic anhydride and 91% by weight of butadiene. Solvent, catalyst and monomers were present in such amounts that the dioxane was present in an amount corresponding to 21% of the total by weight. The catalyst, cumene hydroperoxide, amounted to 6% by weight of the monomers. The materials were charged into a Pyrex reaction bottle and immersed in a heating bath. The sealed bottle was agitated in the bath by turning it end over end. The temperature was maintained at 100° C. for 18 hours. The contents of the reaction bottle were poured into approximately 3 volumes of methanol per volume of reaction mixture. Analysis of the polymer indicated that approximately 2.3% maleic anhydride by weight was incorporated therein, and the chemically determined unsaturation was 1.63 moles/100 g. After separation of the solvent, the polymer was a viscous liquid.

EXAMPLE 2

Similar polymers were prepared in a 1-gallon autoclave by the following procedure:

The reactants, butadiene and maleic anhydride, were employed in the ratio of 91:9, respectively. Six percent of the total weight of reactants was equal to the weight taken as the initiator, which was cumene hydroperoxide. The total weight of reactants and initiator was then equal to 79 weight percent of the total charge, the remaining 21 percent being the solvent, dioxane.

Maleic anhydride and cumene hydroperoxide were dissolved in dioxane and the solution was charged to the autoclave. Butadiene was charged from a pressure cylinder into the autoclave, which was sealed and then heated to 100° C.,±1° C., for 6 hours or 17–18 hours.

At the end of the time of the reaction the autoclave was vented at 50° C. into a "Dry Ice"-cooled pressure bomb, which removed most of the unreacted butadiene and some of the dioxane.

When the polymer solutions cooled, unreacted maleic anhydride precipitated. It was determined that most of this could be removed by filtration through a very coarse filter paper.

To precipitate and purify the polymer the filtrate was poured into three times its own volume of methanol, and the polymer was dried with heat and vacuum on a Rinco Spindrier. The purified polymer was analyzed for carbon and hydrogen and for unsaturation.

Analyses show that not all of the polymer structure of these polymers is represented (or detected) by the percent maleic anhydride (from C and H analysis or carbonyl analysis) plus unsaturation (which should account for most, if not all, the butadiene incorporated in the polymer). Cyclization, possibly resulting in some tetra-substituted vinyl unsaturation, or cross-linking would account for "loss" of unsaturation, but other explanations are possible.

The proportions of reactants and results are indicated by the following tables:

*Table I*

| Experiment No. 2 | Reaction Time, hrs. | Weights of Materials Charged in Grams | | | |
|---|---|---|---|---|---|
| | | Butadiene | Maleic Anhydride | Peroxide | Dioxane |
| A | 18 | 1,023 | 102 | 67 | 316 |
| B | 17 | 930 | 90 | 61 | 287 |
| C | 6 | 1,060 | 103 | 70 | 327 |
| D | 17.5 | 802 | 79.4 | 54 | 252 |

*Table II*

PURIFIED POLYMERS

| Experiment No. 2 | C and H, percent Avg. 2 detns. | | Unsaturation, by Infrared, moles/100 g. | | C=O, mole/100 g, I.R. | Maleic Anhydride, Percent, Based on C=O |
|---|---|---|---|---|---|---|
| | C, percent | H, percent | trans C=C | Mono Subs. Vinyl | | |
| A | 86.32 | 10.71 | 0.77 | 0.21 | 0.05 | 2.5 |
| B | 84.88 | 10.41 | | | | |
| D | | | 0.83 | 0.21 | 0.03 | 1.5 |

The maleic anhydride content of the polymer, where recited herein, is as determined by infrared evaluation of carbonyl content; it is to be understood that estimates of the content of this monomer based on unsaturation and on carbon and hydrogen determinations are higher but are considered to be no more reliable.

After several months the polymer of Experiment 2B was evaluated for unsaturation with iodine monobromide and the results indicated 1.44 moles/100 g. of unsaturation. The intrinsic viscosity of this polymer was 0.175 dl./g. at 100° F.

EXAMPLE 3

A similar reaction was conducted in a 1-gallon autoclave with a mixed solvent of naphtha (boiling point 63–75° C.) and a small proportion of acetone and utilizing cumene hydroperoxide. Reaction data appears in Table III.

*Table III*

| Charge Weight in Grams | | | | Reaction | |
|---|---|---|---|---|---|
| Butadiene | Solvent | Maleic Anhydride | Cumene Hydroperoxide | Temp. ° C. | Time, hrs. |
| 945 | Naphtha 255, Acetone 5 | 30 | 39 | 100 | 6 |

The analysis of the polymer indicated that the trans unsaturation amounted to 0.8 mole/100 g., and monosubstituted vinyl saturation was 0.2 mole/100 g.

EXAMPLE 4

Another autoclave polymerization was made using 950 g. butadiene; 9.7 g. maleic anhydride; 28 g. benzoyl peroxide; and 219 g. xylene. The mixture was heated to 100° C. for 6 hours. The polymer solution was evaporated on the spin drier at room temperature which removed condensed gas.

EXAMPLE 5

A charge of 600 g. butadiene, 12 g. t-butyl-hydro-peroxide, 6 g. of maleic anhydride, and 600 g. xylene was placed in the autoclave and heated to 130° C. for 2.25 hours, cooled and vented. 51 g. of vent gas and 1175 g. polymer solution were recovered.

The polymer of Example 5 was analyzed, and the results indicated that the chemically determined unsaturation utilizing iodine monobromide was 1.34 moles/100 g. The total determinable unsaturation by infrared analysis was 1.4 moles/100 g. Trans unsaturation was 0.93 mole/100 g.; vinyl unsaturation was 0.38 mole/100 g.; and estimated cis unsaturation was 0.09 mole/100 g. The carboxy content utilizing a butyl acetate standard, was 0.03 mole/100 g. Carbon analyses, two determinations, gave 87.23 and 87.44%, the hydrogen analyses being 11.38 and 11.12%.

This invention also comprises coating a metal surface with the polymer as defined above and curing the coating preferably in the presence of air or oxygen, and preferably by baking. In the case of a flat metal article such as tin plate, the polymer, for example as a 50% solution of non-volatile (NV) solids in xylene, may be roller coated by conventional procedures. Other coating methods may be used, including brushing, spraying and immersing or dipping an article in the polymer composition, the viscosity of the compounded polymer being related to the coating method used. Preferably the polymer coating is cured in the presence of air at temperatures between about 150° C. and about 500° C. for a period of between about 0.1 second and about 15 minutes. In addition to conventional baking ovens, using radiated heat for example, induction heating may be used, on the coated metal sheet or on a formed can, coated after forming with the polymer utilized. Hot natural gas combustion products, comprising air, may come into direct contact with the coating being cured. The mechanism of curing is analogous to that of natural drying oils, and involves oxidation, further polymerization, and cross-linking of the synthetic drying oil or polymer.

By way of illustration, the description as to a metal substrate is directed primarily to electrolytic tin coatings upon ferrous metal, black iron, and aluminum, although other metals are useful as hereinafter set forth. A particularly important area of application of this invention is in the can lining art. Of the billions of metallic cans used in the United States annually, approximately 60 percent are food cans, 15 percent are beer cans, and 2 percent are pet food cans. Various organic or resinous linings for such cans have been used in the past for the purpose of supplementing the corrosion resistance of tin plate or as a substitute therefor. Can linings must be resistant to can contents, alkalies, acids, moisture, and solvents. They must be non-toxic, odor-free, and develop no flavors on standing. Processing of the can after applying the coating, involving fabrication, cutting or stamping and the formation of seams, including steps such as soldering, causes many lining materials to fail. The can may be processed along with its contents for periods of an hour or more at temperatures of 200° to 400° F., (93°–204° C., approximately). Commonly the canned products stand for one to two years before being used, and any deterioration of the container may contaminate the contents.

In addition to can linings the process and product of the present invention include applications such as protective and decorative coatings on articles of hardware such as door knobs, electrical insulation, varnishes, and protective coatings for metals in general.

The particular metal articles useful in this invention are prepared by known methods. Thus conventional tinplate is prepared by electroplating using an aqueous electrolyte to obtain a layer of tin of about 0.03 mil thickness or ¼ pound tin per base box. A base box is the area of 112 sheet metal plates 14 inches by 20 inches equal to 217.78 sq. ft., 20.232 sq. meters, or 31,360 sq. inches. The tinplate may also be ½ pound electro tinplate, and may vary from about ⅛ pound to 10 pounds or more per base box. The surface may be so-called bright tin and/or contain an oxide coating anodically or otherwise produced. Tinplate coated by hot-dip methods is useful. For the production of black steel or iron conventional treatments include using hot aqueous solutions of alkaline compounds such as sodium hydroxide and alkali metal nitrates and nitrites, in which case a black oxide coating is obtained. Other metal surfaces may also be treated according to this invention. For example, aluminum, rolled, "spun," or otherwise formed may be coated without further treatment or may have an anodically produced aluminum oxide coating thereupon, which in turn may be a porous oxide or may be sealed with hot water, steam, or various nickel and cobalt salts. In addition, steel, zinc, galvanized ferrous metal, copper, brass, and other metal surfaces may be treated using the process of this invention and to obtain the product of this invention.

A typical procedure to apply coatings of the polymers to form useful products and test polymers is to dilute the polymer to 50% non-volatiles (NV) in xylene if necessary, and to utilize a drawbar to manually apply a liquid film of polymer or polymer in solution of 1 mil or 1½ mils thick, the metal substrate being ¼ pound electrolytic tinplate. In curing the polymer identical test blanks were subjected to different temperatures in the presence of air, the representative commercially useful ones chosen here being approximately 350° F., 400° F., and 450° F., maximum metal temperature. The articles were subjected to these temperatures for a period of ten minutes.

Some of the objective and subjective tests of the cured test blank may be defined as follows:

I. Wedge bend; five pound weight dropped on wedge of varying sharpness which is placed against a coated sheet of tinplate cured as above and bent generally into a U-shape with the wedge placed in the trough formed thereby. This measures the adhesion, flexibility, and impact resistance of the film, and simulates the formation of a side seam in a can forming operation. Evaluation of this test is performed by immersing the article in a solution of copper sulfate treated to plate copper onto the exposed metallic surface. A score of 100 is perfect.

II. 202 can end fabrication; testing of a can end assembled from tinplate having a cured polymer coating which is placed in copper sulfate solution as above. This measures adhesion and abrasion resistance of a can end double seam, and is rated good, fair, poor or numerically.

III. Boiling water; the cured coated article is placed in boiling water to obtain an indication of the ability of the film to withstand high temperature processes. Any whitening of the film is called "blushing," and any peeling of the film is noted. If the film is satisfactory in this test, it is rated as "passing" the test.

Other tests, such as the conventional pencil "hardness" tests, evaluations, of the appearance; dry properties such as tackiness or lack thereof, integrity of the film peeled or scraped from the substrate, adherence to the substrate, and acetone resistance, are useful.

The liquid film is between 0.005 and 75 mils in thickness, preferably between 0.1 and 2.0 mils, and has a non-volatile polymer content of from 10% to 100%, preferably 50% to 60% as a minimum. The dry film is between about .005 and 50 mils in thickness, and preferably is present in an amount corresponding to 2 to 7 mg./sq. in., although not limited generally to this weight, the approximate operable range for most uses being 0.3 to 50 mg./sq. inch.

EXAMPLE 6

The viscous liquid polymers prepared in Examples 1, 3, and 5 above were diluted with solvent, applied to ¼ pound box basis electrolytic tinplate sheets as a 1 mil wet film, baked in the presence of air at the indicated temperatures for 10 minutes, and evaluated. The following results were obtained:

| Polymer of Example No. | Wedge Bend Test | | | 202 Can End Test | | |
|---|---|---|---|---|---|---|
| | 350° | 400° | 450° | 350° | 400° | 450° |
| 1 | 94 | 59 | 45 | 85 | 85 | 50 |
| 3 | 79 | 56 | 40 | 70 | 55 | |
| 5 | 86 | 60 | | 75 | 45 | |

All of the coatings passed the boiling water test, the tabulated tests above being representative of the general physical qualities of the coated panels. The appearance and general physical properties of the coatings including integrity, adhesiveness, and acetone resistance were good to excellent.

An important advantage is that commercial tin-plate may generally be used without preliminary removal of oily coatings commonly present. In some cases, however, undissolved gel in the polymer or some other factor seems to cause "eyeholes" to appear in the coating. The eyeholes where they appear may be eliminated readily by purifying the polymer, or compounding the polymer with materials including vinyl type polymers such as polyvinyl butyral, silicone oils and resins, natural drying oil type polymers, "Cellosolve" plasticizers, ethyl cellulose, aluminum isopropylate and 2-ethylhexanol, pine oil, and various wetting agents.

EXAMPLE 6A

Using black iron (CMQ Black Plate) in place of the tin-plated sheet of Example 5, similar results were obtained.

EXAMPLE 7

Good results were obtained using aluminum in place of the substrate of Example 5.

The polymers of the invention are amenable to improvement or adaptation for specific application by the use of compounding ingredients. Thus, driers such as manganese and cobalt phthalates and oleates are sometimes useful, as are natural drying oils, fillers, pigments, and plasticizers. Carboxylation of the polymers or other known after-treatments may be applied to modify the polymer properties.

I claim:

1. As an article of manufacture, a metal article having a surface thereof coated with a flexible, adherent, cured resinous layer of a copolymer from a monomer mixture consisting essentially of about 9 to 99.5% butadiene with about 0.5 to 10% maleic anhydride, said copolymer prior to curing having drying properties, and having about 0.01 to 0.15 mole/100 g. of cis unsaturation, about 0.70 to 0.95 mole/100 g. of trans unsaturation and about 0.10 to 0.45 mole/100 g. of monosubstituted vinyl unsaturation.

2. As an article of manufacture, a metal article having a surface thereof coated with a flexible, adherent, air cured resinous layer of an organic peroxy compound-catalyzed, liquid, unsaturated copolymer containing about 0.1 to 5% maleic anhydride and about 95 to 99.9% butadiene.

3. As an article of manufacture, a metallic container having a surface thereof coated with a flexible, adherent, cured resinous layer of a copolymer from a monomer mixture consisting of about 90 to 99.5% butadiene with about 0.5 to 10% maleic anhydride, said copolymer prior to curing having drying properties, and having about 0.01 to 0.15 mole/100 g. of cis unsaturation, about 0.70 to 0.95 mole/100 g. of trans unsaturation and about 0.10 to 0.45 mole/100 g. of monosubstituted vinyl unsaturation.

4. As an article of manufacture, a metallic container having a surface thereof coated with a flexible, adherent, cured resinous layer of an organic peroxy compound-catalyzed copolymer containing about 0.1 to 5% maleic anhydride and about 95 to 99.9% butadiene.

5. A process of preparing a metal article having a protective coating thereupon comprising the steps of coating a metal surface with a liquid composition comprising an unsaturated copolymer containing from about 0.1 to 5% maleic anhydride and from about 95 to 99.9% butadiene, said copolymer prior to curing having drying properties and having about 0.01 to 0.15 mole/100 g. of cis unsaturation, about 0.70 to 0.95 mole/100 g. of trans unsaturation, about 0.10 to 0.45 mole/100 g. of monosubstituted vinyl unsaturation, and curing the coating to a resinous state.

6. A process of preparing a metal article having a protective coating thereupon comprising the steps of preparing an unsaturated copolymer having drying properties by subjecting a monomer mixture having about 90 to 99.5% butadiene and about 0.5 to 10% maleic anhydride to an elevated temperature in the presence of an organic peroxy catalyst, recovering said copolymer as a liquid composition having about 0.01 to 0.15 mole/100 g. of cis unsaturation, about 0.70 to 0.95 mole/100 g. of trans unsaturation, about 0.10 to 0.45 mole/100 g. of monosubstituted vinyl unsaturation, coating a surface of said article therewith, and curing the coating to a hard resinous adherent film.

7. A method of preparing an unsaturated liquid copolymer having properties of drying oils comprising the steps of subjecting a monomer mixture consisting of about 90 to 99.5% butadiene and about 0.5 to 10% maleic anhydride to an elevated temperature in the presence of an organic peroxy catalyst, and recovering a liquid copolymer having about 0.01 to 0.15 mole/100 g. of cis unsaturation, about 0.70 to 0.95 mole/100 g. of trans unsaturation, about 0.10 to 0.45 mole/100 g. of monosubstituted vinyl unsaturation.

8. An unsaturated, organic peroxy compound-catalyzed, liquid copolymer containing about 0.1 to 5% maleic anhydride and about 95 to 99.9% butadiene, said copolymer having about 0.01 to 0.15 mole/100 g. of cis unsaturation, about 0.70 to 0.95 mole/100 g. of trans unsaturation, and about 0.10 to 0.45 mole/100 g. of mono-substituted vinyl unsaturation.

References Cited in the file of this patent
UNITED STATES PATENTS

| | | |
|---|---|---|
| 2,142,980 | Huijser et al. | Jan. 3, 1939 |
| 2,179,040 | Heuer | Nov. 7, 1939 |
| 2,205,108 | Rosen | June 18, 1940 |
| 2,652,342 | Gleason | Sept. 15, 1953 |
| 2,768,908 | Cull | Oct. 30, 1956 |

UNITED STATES PATENT OFFICE
CERTIFICATE OF CORRECTION

Patent No. 3,081,283　　　　　　　　　　　　　　　March 12, 1963

George Bosmajian

It is hereby certified that error appears in the above numbered patent requiring correction and that the said Letters Patent should read as corrected below.

Column 8, line 51, for "9 to 99.5%" read -- 90 to 99.5% --.

Signed and sealed this 12th day of November 1963.

SEAL)
Attest:
RNEST W. SWIDER

Attesting Officer

EDWIN L. REYNOLDS

Acting Commissioner of Patents